United States Patent
Goh et al.

(10) Patent No.: US 9,826,724 B2
(45) Date of Patent: Nov. 28, 2017

(54) HANDLE ASSEMBLY

(71) Applicant: Shimano Components (Malaysia) SDN. BHD., Pontian, Johor (MY)

(72) Inventors: Miang Chin Goh, Johor (MY); Wen Yin Lee, Johor (MY); Hwee Yun Loh, Johor (MY)

(73) Assignee: SHIMANO COMPONENTS (MALAYSIA) SDN., Johor (MY)

( * ) Notice: Subject to any disclaimer, the term of this patent is extended or adjusted under 35 U.S.C. 154(b) by 134 days.

(21) Appl. No.: 14/836,372

(22) Filed: Aug. 26, 2015

(65) Prior Publication Data

US 2016/0088823 A1 Mar. 31, 2016

(30) Foreign Application Priority Data

Sep. 26, 2014 (JP) ................................. 2014-196347

(51) Int. Cl.
*A01K 89/00* (2006.01)
*G05G 1/10* (2006.01)

(52) U.S. Cl.
CPC ............. *A01K 89/006* (2013.01); *G05G 1/10* (2013.01)

(58) Field of Classification Search
CPC .......... A01K 89/006; B25G 1/00; B25G 1/10; F16H 59/0278; F16K 31/60; G05G 1/06; G05G 1/085; G05G 1/10
See application file for complete search history.

(56) References Cited

U.S. PATENT DOCUMENTS

| 4,830,306 A * | 5/1989 | Tsunoda | A01K 89/01 242/316 |
| 5,934,587 A * | 8/1999 | Yamaguchi | A01K 89/006 242/283 |
| 6,364,229 B1 * | 4/2002 | Kang | A01K 89/006 242/282 |
| 8,695,909 B2 * | 4/2014 | Niitsuma | A01K 89/006 242/283 |

FOREIGN PATENT DOCUMENTS

| EP | 2347649 A1 * | 7/2011 | ......... A01K 89/0111 |
| JP | S52-8716 Y | 2/1977 | |
| JP | 2002281870 A * | 10/2002 | |
| JP | 2005080621 A * | 3/2005 | |

(Continued)

OTHER PUBLICATIONS

Machine translation of JP 2002-281870 A obtained on Feb. 22, 2017.*

(Continued)

*Primary Examiner* — Adam D Rogers
(74) *Attorney, Agent, or Firm* — Global IP Counselors, LLP

(57) ABSTRACT

A present handle assembly is mounted to a handle shaft of a fishing reel. The handle assembly includes a handle arm and a handle knob. The handle arm is mounted to the handle shaft. The handle knob is mounted to the handle arm. The handle arm herein includes an arm body made of metal and a resin portion. The metallic arm body has a mount part and an arm part. The mount part is mounted to the handle shaft. The arm part is integrally formed with the mount part. The resin portion covers the mount part and at least a part of the arm part.

14 Claims, 4 Drawing Sheets

(56) References Cited

FOREIGN PATENT DOCUMENTS

| JP | 2010119355 A | * | 6/2010 |
|----|--------------|---|--------|
| JP | 2011229417 A | * | 11/2011 |
| JP | 2013009603 A | * | 1/2013 |

OTHER PUBLICATIONS

Machine translation of JP 2010-119355 A obtained on Feb. 22, 2017.*
Machine translation of JP 2011-229417 A obtained on Feb. 22, 2017.*

* cited by examiner

HANDLE ASSEMBLY

CROSS-REFERENCE TO RELATED APPLICATIONS

This application claims priority to Japanese Patent Application No. 2014-196347 filed on Sep. 26, 2014, the entirety of which is hereby incorporated by reference in its entirety.

BACKGROUND

Field of the Invention

The present invention relates to a handle assembly, particularly to a handle assembly mounted to a handle shaft of a fishing reel.

Background Information

A handle assembly to be mounted to a handle shaft of a fishing reel has been disclosed as a conventional technology (see Japan Examined Utility Model Registration No. S52-008716). The handle assembly includes a handle arm and a handle knob mounted to the handle arm. The handle arm has an arm body and a reinforcement member (a box-like member) made of metal. The arm body is made of lightweight synthetic resin. The metallic reinforcement member is embedded in the middle of the arm body in order to reliably achieve stiffness required for the arm body. Furthermore, the handle knob is mounted to one end of the arm body. The other end of the arm body is mounted to the handle shaft.

In the conventional handle assembly, the arm body is made of lightweight synthetic resin. Furthermore, the arm body is mounted to the handle shaft at the other end (a mount part) thereof. In other words, the strength of the mount part of the arm body may not be secured sufficiently when the mount part is mounted to the handle shaft, as the mount part is made of lightweight synthetic resin.

SUMMARY

The present invention has been produced in view of the aforementioned drawback. It is an object of the present invention to provide a handle assembly in which the strength of a part mounted to a handle shaft can be enhanced.

A handle assembly according to a first aspect is mounted to a handle shaft of a fishing reel. The handle assembly includes a handle arm and a handle knob. The handle arm is mounted to the handle shaft. The handle knob is mounted to the handle arm. The handle arm herein includes an arm body made of metal and a resin portion. The metallic arm body has a mount part and an arm part. The mount part is mounted to the handle shaft, and the arm part is integrally formed with the mount part. The resin portion covers the mount part and at least a part of the arm part.

In the present handle assembly, the handle arm includes the metallic arm body and the resin portion. The metallic arm body is mounted at the mount part thereof to the handle shaft. In other words, in the present handle assembly, the mount part of the arm body is made of metal. Thus, joint strength can be enhanced between the handle arm and the handle shaft. Additionally, the resin portion covers at least a part of the arm part of the arm body and the mount part of the arm body. Hence, joint strength can be further enhanced between the handle arm and the handle shaft. Furthermore, only a minimum requisite portion for reliably achieving strength and stiffness required for the handle arm is formed as the metallic arm body, whereas the remaining portion is formed as the resin portion. With the construction, reduction in weight of the handle assembly can be achieved simultaneously.

A handle assembly according to a second aspect relates to the handle assembly recited in the first aspect, and wherein the mount part of the arm body includes a first mount part and a second mount part disposed away from the first mount part at an interval. The handle shaft is mounted to and disposed between the first mount part and the second mount part. Furthermore, the resin portion is integrally molded to and disposed outside the first mount part and the second mount part.

In the construction, the handle shaft is mounted to and disposed between the first and second mount parts of the arm body. Thus, when the handle arm is rotated about the handle shaft, forces act on the first and second mount parts in outwardly opposite directions. However, in the present handle assembly, the resin portion is integrally molded to and disposed outside the first and second mount parts. Thus, the resin portion can prevent deformation of the first and second mount parts in outwardly opposite directions.

A handle assembly according to a third aspect relates to the handle assembly recited in the first and second aspect, and wherein the resin portion is outsert-molded to the arm body so as to cover the mount part and at least a part of the arm part.

In the construction, even where the shape of the metallic arm body is fixed, the handle arm can be easily formed with a different appearance by changing a mold to be used for outsert-molding. On the other hand, where the dimension of the metallic arm body is fixed, the handle arm is mountable to a handle shaft of another fishing reel of the same type as the present fishing reel even by variously changing the appearance thereof.

A handle assembly according to a fourth aspect relates to the handle assembly recited in any one of the first to third aspects, and wherein the arm part includes a covered section and an exposed section. The covered section is herein covered with the resin portion, and the exposed section is a remaining section of the arm part except for the covered section.

In the construction, the covered section of the arm part in the arm body is a section covered with the resin portion. On the other hand, the exposed section of the arm part is a section except for the covered section, i.e., a section exposed to the outside. Thus, the arm part is partially covered with the resin portion. Therefore, it is possible to simultaneously achieve strength and stiffness required for the arm part and reduction in weight of the handle assembly.

A handle assembly according to a fifth aspect relates to the handle assembly recited in the fourth aspect, and wherein the resin portion is integrally molded to the covered section such that the resin portion and the exposed section are flush with each other.

In the construction, the resin portion and the exposed section of the arm part of the arm body are flush with each other in the handle arm. Thus, no step is formed in a boundary between the resin portion and the exposed section. Therefore, the handle arm can be enhanced in its aesthetic appearance, and the fishing line can be prevented from getting stuck with the surface of the handle arm.

A handle assembly according to a sixth aspect relates to the handle assembly recited in any one of the first to fifth aspects, and wherein the handle shaft has a first hole. The mount part has a second hole communicating with the first hole. The resin portion has a third hole communicating with the second hole. Furthermore, the mount part is pivotably mounted to the handle shaft by inserting a shaft member into the third hole and then through the first and second holes.

In the construction, the mount part is pivotably mounted to the handle shaft by the shaft member disposed so as to penetrate the first hole of the handle shaft, the second hole of the mount part, and the third hole of the resin portion. Thus, even where the mount part is covered with the resin portion, the mount part can be pivotably mounted to the handle shaft. Furthermore, the shaft member enables the mount part to be mounted to the handle shaft without being exposed to the outside of the resin portion by setting the length of the shaft member such that the both ends of the shaft member can be located inside the third holes of the resin portion. In other words, the handle arm can be enhanced in its aesthetic appearance.

Overall, according to the present invention, it is possible to provide a handle assembly in which the strength of a part mounted to a handle shaft can be enhanced.

BRIEF DESCRIPTION OF THE DRAWINGS

Referring now to the attached drawings which form a part of this original disclosure.

DETAILED DESCRIPTION OF EMBODIMENTS

Figure 1:
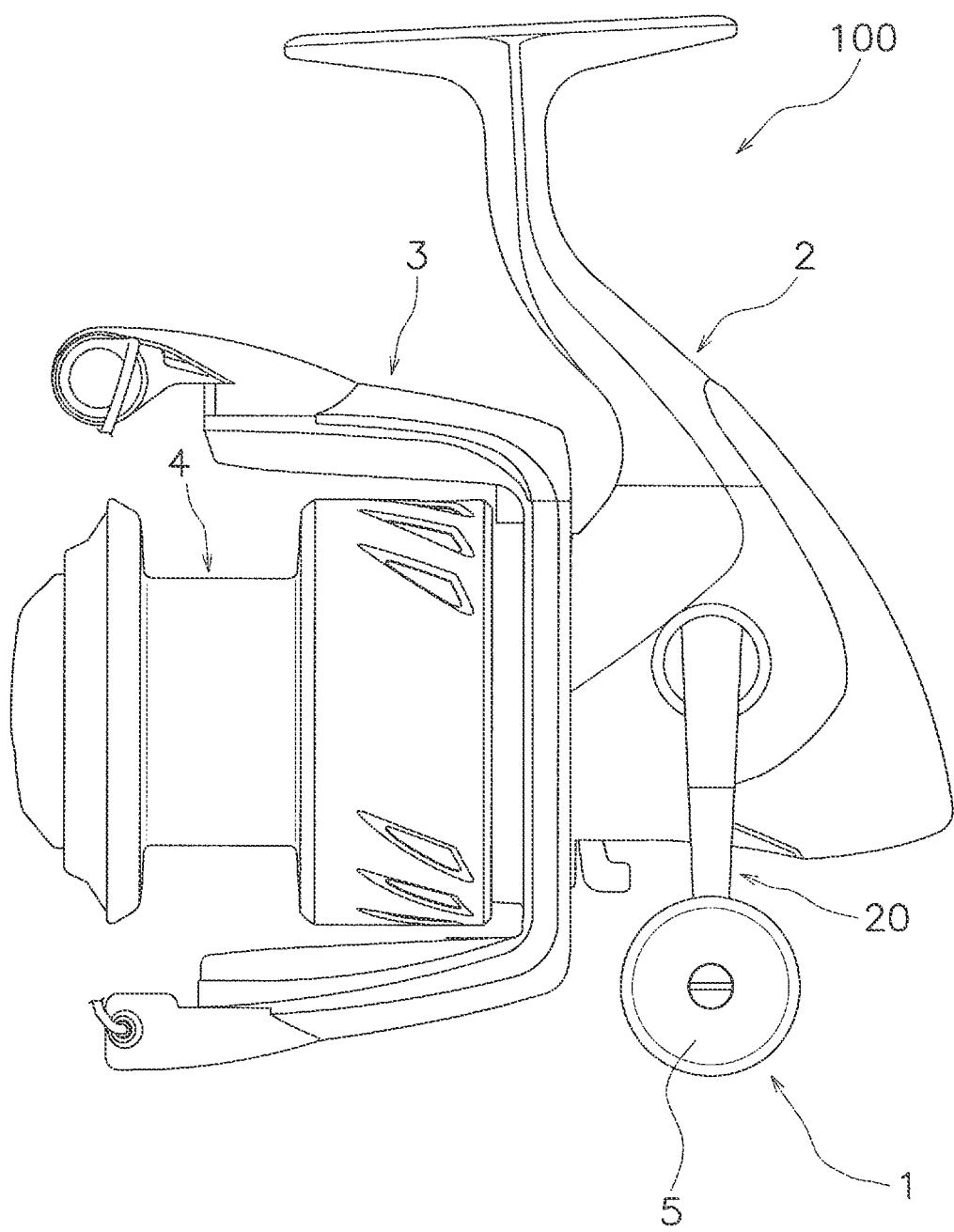
FIG. 1 is a side view of a spinning reel according to a preferred embodiment of the present invention.

In FIG. 1, a spinning reel 100 according to a preferred embodiment of the present invention is capable of reeling out (casting) a fishing line in the forward direction (leftward in FIG. 1).

The spinning reel 100 includes a handle assembly 1, a reel unit 2 supporting the handle assembly 1 in a rotatable state, a rotor 3 and a spool 4.

The handle assembly 1 is configured to rotate the rotor 3 and move the spool 4 back and forth. The handle assembly 1 will be described below in detail.

The rotor 3 is rotatably supported at the front of the reel unit 2. The rotor 3 is herein configured to be rotated when rotation of the handle assembly 1 is transmitted to the rotor 3 through a rotor drive mechanism (not shown in the drawings). It should be noted that the rotor drive mechanism is configured to be driven through a handle shaft 10 to which the handle assembly 1 is coupled.

The spool 4 is configured to wind the fishing line onto the outer peripheral surface thereof, and is disposed at the front of the rotor 3 so as to be movable back and forth. The spool 4 is herein configured to be reciprocated back and forth when the rotation of the handle assembly 1 is transmitted to the spool 4 through an oscillating mechanism (not shown in the drawings). It should be noted that the oscillating mechanism is configured to be driven through the handle shaft 10 to which the handle assembly 1 is coupled.

The handle assembly 1 is attachable to either of the right and left sides of the reel unit 2 shown in FIG. 1. It should be herein noted that "right" and "left" are directional terms defined when the spinning reel 100 is seen from its back side. Furthermore, "up" and "down" are directional terms defined in FIG. 1.

As shown in FIGS. 1 to 4, the handle assembly 1 is mounted to the handle shaft 10. The handle shaft 10 is mounted to a drive shaft (not shown in the drawings) for driving the rotor drive mechanism and the oscillating mechanism so as to be unitarily rotatable therewith. The handle shaft 10 is configured to rotate the drive shaft when engaged with the drive shaft. On the other hand, the handle shaft 10 and the drive shaft can be disengaged from each other. The handle shaft 10 and the drive shaft are disengaged from each other, for instance, when the handle assembly 1 is folded or when the handle assembly 1 is detached from the reel unit 2. It should be noted that for instance, the handle shaft 10 and the drive shaft are engaged by screw engagement, non-circular engagement or so forth. The handle shaft 10 has a first hole 10a for handle attachment (see FIG. 4). The handle assembly 1 is mounted to the handle shaft 10 through the first hole 10a.

As shown in FIG. 1, the handle assembly 1 includes a handle knob 5 and a handle arm 20. The handle knob 5 is mounted to the handle arm 20. Specifically, the handle knob 5 is rotatably mounted to the handle arm 20.

Figure 4:
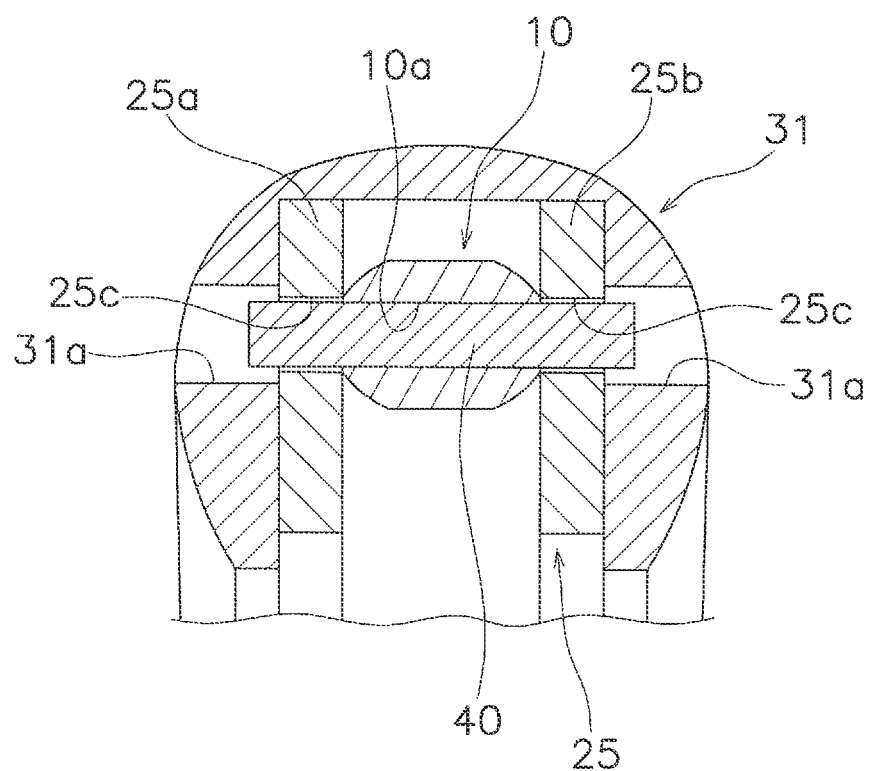
FIG. 4 is a cross-sectional view taken along line IV-IV in FIG. 2A.

As shown in FIG. 4, the handle arm 20 is mounted to the handle shaft 10. Specifically, the handle arm 20 is mounted to the handle shaft 10 so as to be unitarily rotatable therewith. It should be noted that description will be given below for a method of mounting the handle arm 20 to the handle shaft 10 so as to make the handle arm 20 unitarily rotatable with the handle shaft 10.

Figure 2A:
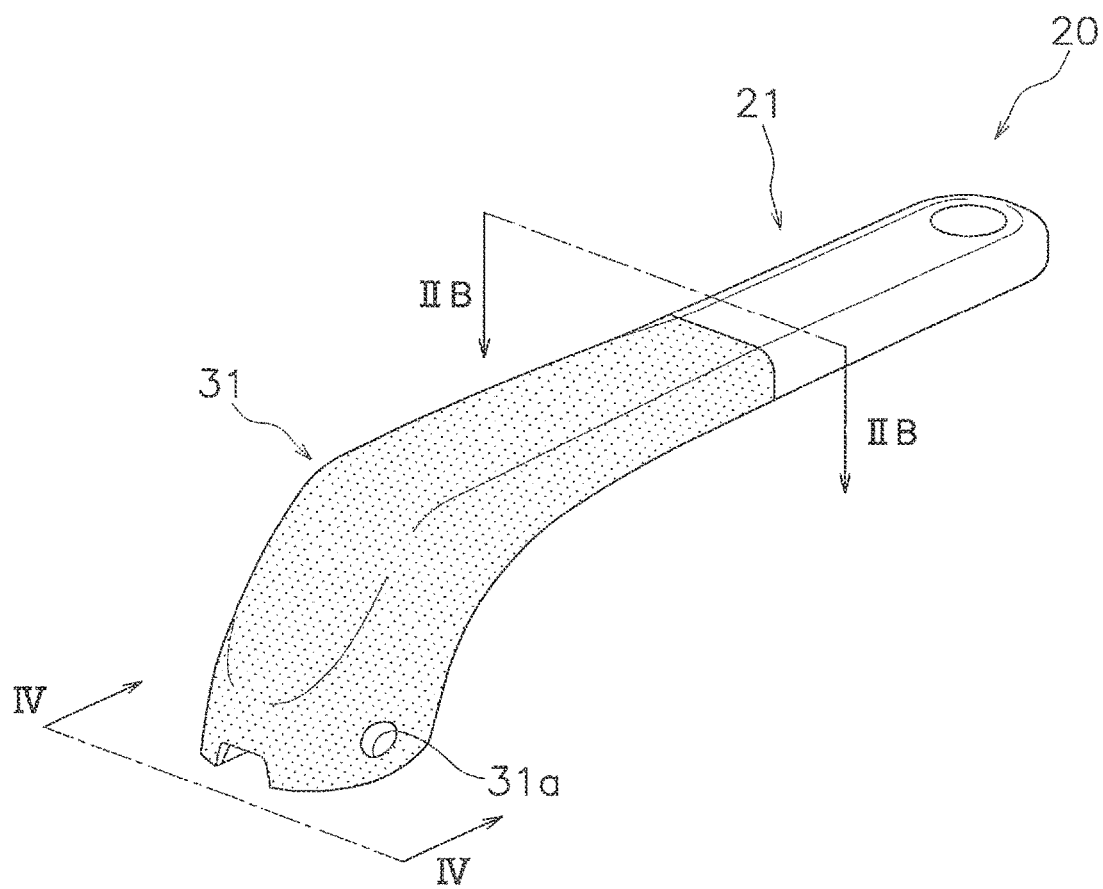
FIG. 2A is a perspective view of the external appearance of a handle arm.
Figure 2B:
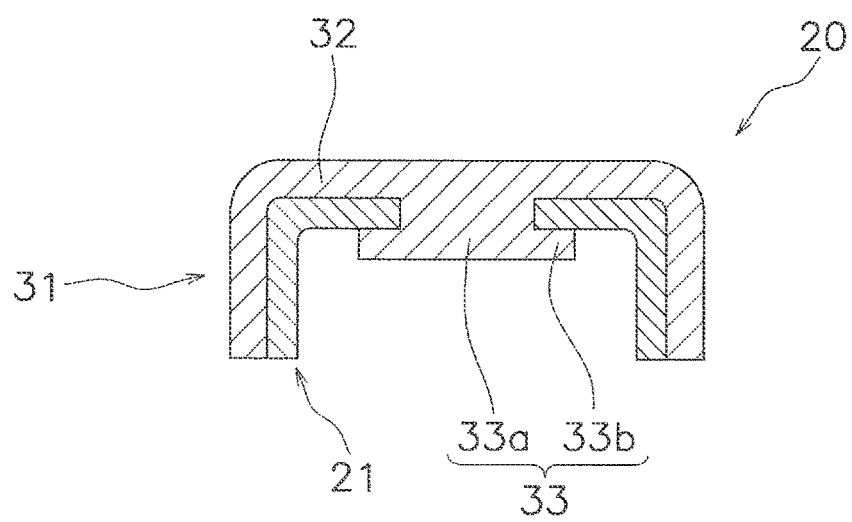
FIG. 2B is a cross-sectional view taken along line II-II in FIG. 2A.
Figure 3:
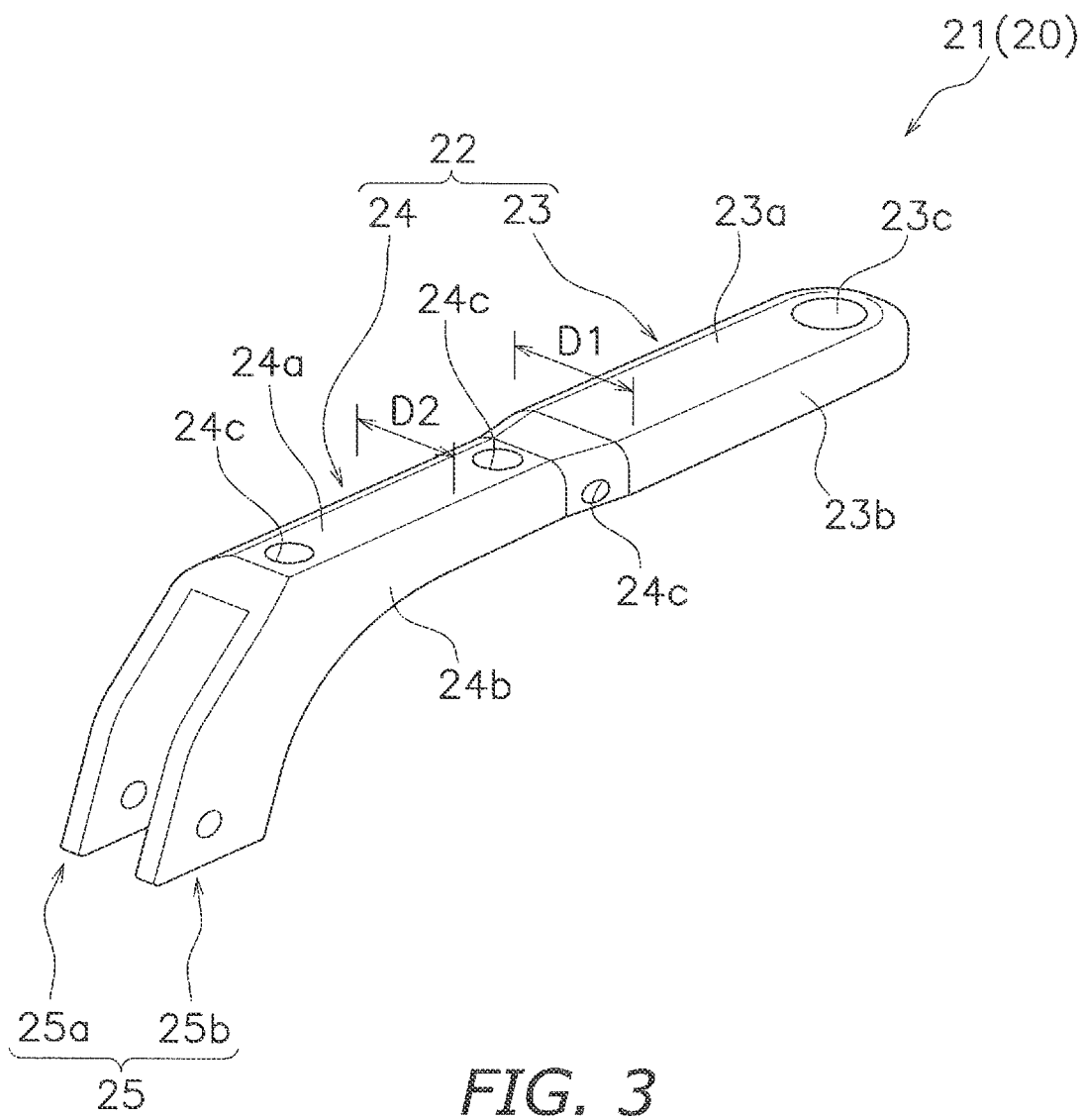
FIG. 3 is a perspective view of the external appearance of an arm body in the handle arm.

As shown in FIGS. 2A, 2B and 3, the handle arm 20 has an arm body 21 made of metal and a resin portion 31. It should be noted that in FIG. 2A, the resin portion 31 is hatched so as to be distinguished from the arm body 21. Additionally, the handle shaft 10 is not illustrated in FIG. 2A.

The metallic arm body 21 is made of, for example, stainless alloy or aluminum alloy. As shown in FIG. 3, the metallic arm body 21 has an arm part 22 and a mount part 25. The arm part 22 is a part extending in one direction. The arm part 22 has a cross-section with a substantially C shape.

The arm part 22 has an exposed section 23 and a covered section 24. The exposed section 23 is a section of the arm part 22 excluding the covered section 24. The exposed section 23 has a first body 23a and a pair of first lateral parts 23b. The first body 23a has a plate shape elongated in one direction. The first lateral parts 23b extend from the outer peripheral part of the first body 23a in a direction opposite to the handle knob 5. One end of the exposed section 23, for instance, one end of the first body 23a of the exposed section 23, has a hole 23c for knob. A fixation member (not shown in the drawings) is inserted through the knob hole 23c. Accordingly, the handle knob 5 is rotatably mounted to one end of the exposed section 23 by the fixation member.

The covered section 24 is covered with the resin portion 31. The covered section 24 is integrally formed with the other end of the exposed section 23. When described in detail, one end of the covered section 24 is integrally formed with the other end of the exposed section 23. The covered section 24 has a second body 24a and a pair of second lateral parts 24b. The second body 24a has a plate shape elongated in one direction. The second lateral parts 24b extend from the outer peripheral part of the second body 24a in a direction opposite to the handle knob 5. The second body 24a is integrally formed with the first body 23a. The second lateral parts 24b are integrally formed with the first lateral parts 23b and the second body 24a.

The covered section 24 further has at least one molding hole 24c for integral molding of the resin portion 31. When described in detail, the second body 24a has a plurality of (e.g., two) molding holes 24c. The two molding holes 24c are bored in the second body 24a at a predetermined interval in the extending direction of the second body 24a. Additionally, the second lateral parts 24b also have a plurality of (e.g., two) molding holes 24c. The two molding holes 24c are bored in the second lateral parts 24b so as to be opposed to each other. It should be noted that FIG. 3 illustrates only one of the molding holes 24c bored in the second lateral parts 24b.

In one end of the covered section 24, its width orthogonal to the extending direction of the covered section 24, for instance, a width D1 of the second body 24a of the covered section 24 (i.e., an interval between the pair of lateral parts of the covered section 24) gradually reduces in a direction opposite to the other end of the exposed section 23. Moreover, in one end of the covered section 24, its surface forming the exposed section 23, for instance, the outer surface of the covered section 24 gradually slants with respect to the outer surface of the first body 23a of the exposed section 23 in the direction opposite to the other end of the first body 23a of the exposed section 23.

In a region between one end and the other end of the covered section 24, its width orthogonal to the extending direction of the covered section 24 is narrower than the width of the other end of the exposed section 23. Specifically, in the region between one end and the other end of the covered section 24, a width D2 of the second body 24a of the covered section 24 is narrower than the width D1 of the first body 23a on the other end of the exposed section 23 (i.e., the width of the second body 24a on one end of the covered section 24). The mount part 25 is integrally formed with the other end of the covered section 24.

As shown in FIGS. 3 and 4, the mount part 25 is mounted to the handle shaft 10. The mount part 25 has a first mount part 25a and a second mount part 25b. The first mount part 25a and the second mount part 25b are disposed away from each other at an interval.

The first mount part 25a is integrally formed with the other end of the covered section 24. Specifically, the first mount part 25a is integrally formed with one of the pair of the second lateral parts 24b so as to outwardly protrude from the other end of the covered section 24. The first mount part 25a has a plate shape. On the other hand, the second mount part 25b is integrally formed with the other end of the covered section 24. Specifically, the second mount part 25b is integrally formed with the other of the pair of the second lateral parts 24b so as to outwardly protrude from the other end of the covered section 24. The second mount part 25b has a plate shape.

The handle shaft 10 is disposed between the first mount part 25a and the second mount part 25b. The handle shaft 10 is mounted to the first mount part 25a and the second mount part 25b.

Specifically, each of the first and second mount parts 25a has a second hole 25c for mounting the handle shaft. In other words, each of a pair of second holes 25c for handle shaft mounting is bored in each of the first and second mount parts 25a and 25b. More specifically, the paired second holes 25c for handle shaft mounting are respectively bored in the first and second mount parts 25a and 25b so as to be opposed to each other. The diameter of each second hole 25c is herein larger than that of the first hole 10a of the handle shaft 10.

The handle assembly 1 is mounted to the handle shaft 10 through the paired second holes 25c bored in the mount part 25 (the first and second mount parts 25a and 25b) for handle shaft mounting and the first hole 10a bored in the handle shaft 10. A method of mounting the handle assembly 1 to the handle shaft 10 will be described below.

As shown in FIGS. 2A, 2B and 3, the resin portion 31 covers the mount part 25 and at least a part of the arm part 22. The resin portion 31 is herein made of synthetic resin. For example, the synthetic resin contains polyamide (nylon). More specifically, the synthetic resin contains polyamide (nylon) reinforced by, for instance, glass fiber and/or carbon fiber.

For example, the resin portion 31 covers the mount part 25 and the covered section 24 of the arm part 22 (see FIG. 3). Specifically, the resin portion 31 covers the covered section 24, the first and second mount parts 25a and 25b, and a space between the first and second mount parts 25a and 25b.

The resin portion 31 is integrally molded to the covered section 24 and the mount part 25. Specifically, the resin portion 31 is integrally molded to the covered section 24 and the first and second mount parts 25a and 25b. Furthermore, the resin portion 31 is integrally molded to the covered section 24 and the mount part 25 such that the resin portion 31 and the exposed section 23 are flush with each other.

Specifically, the resin portion 31 is outsert-molded to the arm body 21 so as to cover the covered section 24 and the first and second mount parts 25a and 25b (including the space between the first and second mount parts 25a and 25b).

For example, as shown in FIG. 3, the resin portion 31 is locked to the covered section 24 through the molding holes 24c of the covered section 24 (the second body 24a and the second lateral parts 24b). More specifically, as shown in FIGS. 2A and 2B, the resin portion 31 has a cover part 32 and at least one lock part 33. The cover part 32 covers the outer side of the covered section 24 and the outer sides of the first and second mount parts 25a and 25b (including the space between the first and second mount parts 25a and 25b).

The lock part 33 has a shaft part 33a and a brim part 33b integrally formed with the shaft part 33a. The shaft part 33a is integrally formed with the cover part 32. The shaft part 33a of the lock part 33 is disposed in each of the molding holes 24c bored in the covered section 24 (the second body 24a and the second lateral parts 24b). The brim part 33b contacts a side of the covered section 24 (the second body 24a and the second lateral parts 24) that is opposite to the cover part 32, i.e., the back side of the covered section 24. Accordingly, the brim part 33b locks the cover part 32 to the covered section 24 through the shaft part 33a. With this construction, the cover part 32 is locked to the covered section 24 by the lock part 33.

In the condition, the resin portion 31 covers the outer side of the covered section 24 and the outer sides of the first and second mount parts 25a and 25b (including the space between the first and second mount parts 25a and 25b) such that the resin portion 31 and the exposed section 23 are flush with each other. As described above, the construction that the resin portion 31 and the exposed section 23 are flush with each other (i.e., the construction that no step is produced between the resin portion 31 and the exposed section 23) is achieved by the width of one end of the covered section 24 and the gradient of one end of the covered section 24.

As shown in FIGS. 2A and 4, the resin portion 31 further has a pair of third holes 31a for handle shaft mounting. The paired third holes 31a for handle shaft mounting are bored in the resin portion 31 so as to communicate with the second holes 25c bored in the mount part 25 for handle shaft mounting. It should be noted that the diameter of each third hole 31a is larger than that of the first hole 10a of the handle shaft 10. The diameter of each third hole 31a is also larger than that of each second hole 25c of the mount part 25.

A method of mounting the handle assembly 1 having the aforementioned construction to the handle shaft 10 will be hereinafter explained with reference to FIG. 4.

First, the handle shaft 10 is disposed between the first and second mount parts 25a and 25b of the arm body 21. When described in detail, the handle shaft 10 is disposed between the first and second mount parts 25a and 25b such that the first hole 10a of the handle shaft 10, the second holes 25c of the first and second mount parts 25a and 25b, and the third holes 31a of the resin portion 31 are disposed concentrically to each other. Next, a shaft member 40 is inserted through the first to third holes 10a, 25c and 31a and is fixed to the first hole 10a. Specifically, the middle part of the shaft member 40 is press-fitted to the first hole 10a of the handle shaft 10, while the both ends of the shaft member 40 are disposed inside the second holes 25c and the third holes 31a. Thus, the handle assembly 1 is mounted to the handle shaft 10.

Both ends of the shaft member 40 are herein disposed inside the second holes 25c of the mount part 25 of the arm body 21. Hence, when the arm body 21 is rotated, the handle shaft 10 is rotated through the shaft member 40. In other words, the handle assembly 1 is mounted to the handle shaft 10 so as to be unitarily rotatable with the handle shaft 10 about the axis of the handle shaft 10. With this construction, when the handle assembly 1 is rotated together with the handle shaft 10 in the condition that the handle shaft 10 is engaged with the drive shaft so as to be capable of driving the drive shaft, the rotor drive mechanism and the oscillating mechanism are configured to be driven through the drive shaft.

Furthermore, as described above, the diameter of each second hole 25c of the mount part 25 is larger than that of the first hole 10a of the handle shaft 10. Hence, when the shaft member 40 is fixed to the first hole 10a of the handle shaft 10, the mount part 25 is pivotable about the shaft member 40. In other words, the handle assembly 1 is mounted to the handle shaft 10 so as to be pivotable about the axis of the shaft member 40. With this construction, when the handle assembly 1 is pivoted about the shaft member 40 in a condition that the handle shaft 10 and the drive shaft are disengaged from each other, the handle assembly 1 is capable of being folded.

Features

The aforementioned preferred embodiment can be expressed as follows.

(A) The handle assembly 1 is mounted to the handle shaft 10 of the fishing reel (the spinning reel 100). The handle assembly 1 includes the handle arm 20 and the handle knob 5. The handle arm 20 is mounted to the handle shaft 10. The handle knob 5 is mounted to the handle arm 20. The handle arm 20 herein includes the arm body 21 made of metal and the resin portion 31. The metallic arm body 21 has the mount part 25 and the arm part 22. The mount part 25 is mounted to the handle shaft 10, and the arm part 22 is integrally formed with the mount part 25. The resin portion 31 covers the mount part 25 and at least a part (the covered section 24) of the arm part 22.

In the present handle assembly 1, the handle arm 20 includes the metallic arm body 21 and the resin portion 31. The metallic arm body 21 is mounted at the mount part 25 thereof to the handle shaft 10. In other words, in the present handle assembly 1, the mount part 25 of the arm body 21 is made of metal. Thus, joint strength can be enhanced between the handle arm 20 and the handle shaft 10. Furthermore, the resin portion 31 covers at least a part of the arm part 22 of the arm body 21 and the mount part 25 of the arm body 21. Hence, joint strength can be further enhanced between the handle arm 20 and the handle shaft 10. Moreover, only a minimum requisite portion for reliably achieving strength and stiffness required for the handle arm 20 is formed as the metallic arm body 21, whereas the remaining portion is formed as the resin portion 311. With this construction, reduction in weight of the handle assembly 1 can be achieved simultaneously.

(B) In the handle assembly 1, the mount part 25 of the arm body 21 includes the first mount part 25a and the second mount part 25b disposed away from the first mount part 25a at an interval. The handle shaft 10 is mounted to and disposed between the first mount part 25a and the second mount part 25b. Furthermore, the resin portion 31 is integrally molded to and disposed outside the first mount part 25a and the second mount part 25b.

In this construction, the handle shaft 10 is mounted to and disposed between the first and second mount parts 25a and 25b of the arm body 21. Thus, when the handle arm 20 is rotated about the handle shaft 10, forces act on the first and second mount parts 25a and 25b in outwardly opposite directions. However, in the present handle assembly 1, the resin portion 31 is integrally molded to and disposed outside the first and second mount parts 25a and 25b. Thus, the resin portion 31 can prevent deformation of the first and second mount parts 25a and 25b in outwardly opposite directions.

(C) In the handle assembly 1, the resin portion 311 is outsert-molded to the arm body 21 so as to cover the mount part 25 and at least a part of the arm part 22.

In this construction, even where the shape of the metal arm body 21 is fixed, the handle arm 20 can be easily formed with a different appearance by changing a mold to be used for outsert-molding. On the other hand, where the dimension of the metallic arm body 21 is fixed, the handle arm 20 is mountable to a handle shaft of another fishing reel of the same type as the spinning reel 100 even by variously changing the appearance thereof.

(D) In the handle assembly 1, the arm part 22 includes the covered section 24 and the exposed section 23. The covered section 24 is herein covered with the resin portion 31, and the exposed section 23 is the remaining section of the arm part 22 except for the covered section 24.

In this construction, the covered section 24 of the arm part 22 in the arm body 21 is a section covered with the resin portion 31. On the other hand, the exposed section 23 of the arm part 22 is a section except for the covered section 24, i.e., a section exposed to the outside. Thus, the arm part 22 is partially covered with the resin portion 31. Therefore, it is possible to simultaneously achieve strength and stiffness required for the arm part 22 and reduction in weight of the handle assembly 1.

(E) In the handle assembly 1, the resin portion 31 is integrally molded to the covered section 24 such that the resin portion 31 and the exposed section 23 are flush with each other.

In this construction, the resin portion 31 and the exposed section 31 of the arm part 22 of the arm body 21 are flush with each other in the handle arm 20. Thus, no step is formed in the boundary between the resin portion 31 and the exposed section 23. Therefore, the handle arm 20 can be enhanced in its aesthetic appearance, and the fishing line can be prevented from getting stuck with the surface of the handle arm 20.

(F) In the handle assembly 1, the handle shaft 10 has the first hole 10a. The mount part 25 has the second holes 25c communicating with the first hole 10a. The resin portion 31 has the third holes 31a communicating with the second holes 25c. Furthermore, the mount part 25 is pivotably mounted to the handle shaft 10 by inserting the shaft member 40 into one of the third holes 31a, then through the first hole 10a and the second holes 25c, and finally to the other of the third holes 31a.

In this construction, the mount part 25 is pivotably mounted to the handle shaft 10 by the shaft member 40 disposed so as to penetrate through the first hole 10a of the handle shaft 10, the second holes 25c of the mount part 25, and the third holes 31a of the resin portion 31. Thus, even where the mount part 25 is covered with the resin portion 31, the mount part 25 can be pivotably mounted to the handle shaft 10. Furthermore, the shaft member 40 enables the mount part 25 to be mounted to the handle shaft 10 without being exposed to the outside of the resin portion 31 by setting the length of the shaft member 40 such that both ends of the shaft member 40 can be located inside the third holes 31a of the resin portion 31. In other words, the handle arm 20 can be enhanced in its aesthetic appearance.

Other Preferred Embodiments

One preferred embodiment of the present invention has been described above. However, the present invention is not limited to the aforementioned preferred embodiment, and a variety of changes can be herein made without departing from the scope of the present invention. Especially, a plurality of preferred embodiments and modifications described in the present specification can be arbitrarily combined on an as-needed basis.

(a) The aforementioned preferred embodiment has exemplified the construction that in one end of the covered section 24 of the arm part 22, the width of the second body 24a of the covered section 24 (i.e., a pair of the lateral parts of the covered section 24) decreases, and the outer surface of the covered section 24 slants. With this construction, even when the resin portion 31 covers the covered section 24 and the mount part 25, the resin portion 31 and the exposed section 23 are flush with each other so as not to produce any step therebetween. Alternatively, the arm part 22 may be constructed so as to produce a step between one end of the covered section 24 and the other end of the exposed section 23. Even with this construction, the resin portion 31 and the exposed section 23 can be flush with each other so as not to produce any step therebetween by integrally molding the resin portion 31 to the covered section 24 and the mount part 25.

(b) The aforementioned preferred embodiment has exemplified the construction that the resin portion 31 is locked to the covered section 24. However, the resin portion 31 may be locked not only to the covered section 24 but also to the mount part 25. For example, the resin portion 31 can be more reliably locked to the mount part 25 by putting a part of the resin portion 31 into the space between the first and second mount parts 25a and 25b.

(c) The aforementioned preferred embodiment has exemplified the construction that each of the lock parts 33 has the shaft part 33a and the brim part 33b. Alternatively, the lock part 33 may have only the shaft part 33a, and the resin portion 31 may be locked to the covered section 24 through the shaft parts 33a.

(d) The aforementioned preferred embodiment has exemplified the construction that the two third holes 31a are disposed on the both sides of the two second holes 25c. Alternatively, only a single third hole 31a may be disposed on one side of a single second hole 25c.

(e) The aforementioned preferred embodiment has exemplified the construction that the first and second mount parts 25a and 25b, composing the mount part 25, protrude from the arm part 22 as separate parts. However, the mount part 25 may protrude from the arm part 22 as an integrated part by forming the mount part 25 with a squared C-shaped cross-section. In the construction, opposed wall parts of the mount part 25 with a squared C-shaped cross-section correspond to the first and second mount parts 25a and 25b. With the mount part 25 thus constructed, the first and second mount parts 25a and 25b can be more reliably prevented from deforming oppositely to each other.

What is claimed is:

1. A handle assembly for a fishing reel, comprising:
   a handle shaft;
   a handle arm mounted to a handle shaft; and
   a handle knob mounted to the handle arm,
   the handle arm including an arm body formed from metal and a resin portion, the arm body having a mount part and an arm part, the mount part including a first mount part and a second mount part spaced from the first mount part, the handle shaft being mounted to and disposed between the first mount part and the second mount part, so as to extend transverse to a longitudinal direction of the first mount part and the second mount part, the arm part being integrally formed with the mount part, and the resin portion covering the mount part and at least a part of the arm part.

2. The handle assembly according to claim 1, wherein the handle shaft is mounted to the mount part via at least one hole.

3. The handle assembly according to claim 1, wherein the resin portion is integrally molded to and disposed outside the first mount part and the second mount part.

4. The handle assembly according to claim 3, wherein the resin portion is outsert-molded to the arm body so as to cover the mount part and at least a part of the arm part.

5. The handle assembly according to claim 3, wherein the arm part includes a covered section and an exposed section, the covered section being covered with the resin portion, the exposed section being a remaining section of the arm part except for the covered section.

6. The handle assembly according to claim 3, wherein the handle shaft has a first hole,
   the mount part has a second hole axially aligned with the first hole,
   the resin portion has a third hole axially aligned with the second hole, and
   the mount part is pivotably mounted to the handle shaft by inserting a shaft member into the third hole and then through the first and second holes.

7. The handle assembly according to claim 1, wherein the resin portion is outsert-molded to the arm body so as to cover the mount part and at least a part of the arm part.

8. The handle assembly according to claim 7, wherein the arm part includes a covered section and an exposed section, the covered section being covered with the resin portion, the exposed section being a remaining section of the arm part except for the covered section.

9. The handle assembly according to claim 7, wherein
the handle shaft has a first hole,
the mount part has a second hole axially aligned with the first hole,
the resin portion has a third hole axially aligned with the second hole, and
the mount part is pivotably mounted to the handle shaft by inserting a shaft member into the third hole and then through the first and second holes.

10. The handle assembly according to claim 1, wherein the arm part includes a covered section and an exposed section, the covered section being covered with the resin portion, the exposed section being a remaining section of the arm part except for the covered section.

11. The handle assembly according to claim 10, wherein the resin portion is integrally molded to the covered section such that the resin portion and the exposed section are flush with each other.

12. The handle assembly according to claim 11, wherein
the handle shaft has a first hole,
the mount part has a second hole axially aligned with the first hole,
the resin portion has a third hole axially aligned with the second hole, and
the mount part is pivotably mounted to the handle shaft by inserting a shaft member into the third hole and then through the first and second holes.

13. The handle assembly according to claim 10, wherein
the handle shaft has a first hole,
the mount part has a second hole axially aligned with the first hole,
the resin portion has a third hole axially aligned with the second hole, and
the mount part is pivotably mounted to the handle shaft by inserting a shaft member into the third hole and then through the first and second holes.

14. A handle assembly for a fishing reel, comprising:
a handle arm mounted to a handle shaft, the handle shaft having a first hole; and
a handle knob mounted to the handle arm, the handle arm including an arm body formed from metal and a resin portion, the arm body having a mount part and an arm part,
the mount part having a second hole axially aligned with the first hole, and being mounted to the handle shaft, the arm part being integrally formed with the mount part, the resin portion covering the mount part and at least a part of the arm part and having a third hole axially aligned with the second hole, and
the mount part being pivotably mounted to the handle shaft by inserting a shaft member into the third hole and then through the first and second holes, and the first, second and third holes being axially aligned.

* * * * *